United States Patent
Nikula et al.

(10) Patent No.: US 8,730,873 B2
(45) Date of Patent: May 20, 2014

(54) ASYMMETRIC BEAM STEERING PROTOCOL

(75) Inventors: Eero Nikula, Veikkola (FI); Padam Lal Kafle, Coppell, TX (US); Kyeongjin Kim, Irving, TX (US); Tuomas Valtteri Laine, Vantaa (FI)

(73) Assignee: Nokia Corporation, Espoo (FI)

( * ) Notice: Subject to any disclaimer, the term of this patent is extended or adjusted under 35 U.S.C. 154(b) by 444 days.

(21) Appl. No.: 13/127,495

(22) PCT Filed: Nov. 4, 2008

(86) PCT No.: PCT/IB2008/054599
§ 371 (c)(1),
(2), (4) Date: May 4, 2011

(87) PCT Pub. No.: WO2010/052519
PCT Pub. Date: May 14, 2010

(65) Prior Publication Data
US 2011/0211490 A1    Sep. 1, 2011

(51) Int. Cl.
*H04W 4/00*    (2009.01)
*H04L 12/26*    (2006.01)

(52) U.S. Cl.
USPC .......................................... 370/328; 370/252

(58) Field of Classification Search
USPC ............................ 343/853; 370/203, 328, 252
See application file for complete search history.

(56) References Cited

U.S. PATENT DOCUMENTS

| | | | |
|---|---|---|---|
| 6,822,619 B2 * | 11/2004 | Shurvinton et al. | 343/853 |
| 7,212,499 B2 | 5/2007 | Hoffmann et al. | |
| 7,366,464 B2 | 4/2008 | Iacono et al. | |
| 2003/0222818 A1 | 12/2003 | Regnier et al. | |
| 2004/0185782 A1 | 9/2004 | Halford et al. | |
| 2006/0164969 A1 * | 7/2006 | Malik et al. | 370/203 |

FOREIGN PATENT DOCUMENTS

| | | |
|---|---|---|
| EP | 1956732 | 8/2008 |
| KR | 2007-0027764 | 1/2007 |
| WO | WO2006003413 | 1/2006 |

OTHER PUBLICATIONS

International Search Report dated Jun. 12, 2009 for International Application No. PCT/IB2008/054599.
Su Khiong Yong et al., "An Overview of Multigigabit Wireless through Millimeter Wave Technology: Potentials and Technical Challenges," EURASIP Journal on Wireless Communications and Networking, vol. 2007, Article ID 78907, Sep. 2006, Hindawi Publishing Corporation, 10 pp.

(Continued)

*Primary Examiner* — Melvin Marcelo
*Assistant Examiner* — Gbemileke Onamuti
(74) *Attorney, Agent, or Firm* — Locke Lord LLP

(57) ABSTRACT

A system for configuring antenna systems for selecting directional communication signals corresponding to other apparatuses. A directional communication signal may be selected as the result of a beam training operation coordinated between at least two apparatuses. Beam selection training sequences may then be broadcast from one apparatus, and the receiving apparatus may determine the quality of each received beam training sequence in order to approximate a vector describing the direction from which the signals were sent.

20 Claims, 10 Drawing Sheets

(56) References Cited

OTHER PUBLICATIONS

Su Khiong Yong, TG3c Channell Modeling Sub-committee Final Report, IEEE P802.15 Wireless Personal Area Networks, Mar. 13, 2007, 25 pp.

J.A.G. Akkermans et al., "Planar Beam-Forming Array for Broadband Communication in the 60 GHz Band," EuCAP 2007, Edinburgh, UK, Nov. 2007, 6 pp.

Kao-Cheng Huang et al., "Millimeter-Wave Circular Polarized Beam-Steering Antenna Array for Gigabit Wireless Communications," IEEE Transactions on Antennas and Propagation, vol. 54, No. 2, Feb. 2006., 4 pp.

Translation of Korean Office Action for Korean Patent Application No. 10-2011-7010946 dated Jul. 30, 2012.

Letter regarding Korean Office Action dated Aug. 21, 2012 for Korean Patent Application No. 2011-7010946.

* cited by examiner

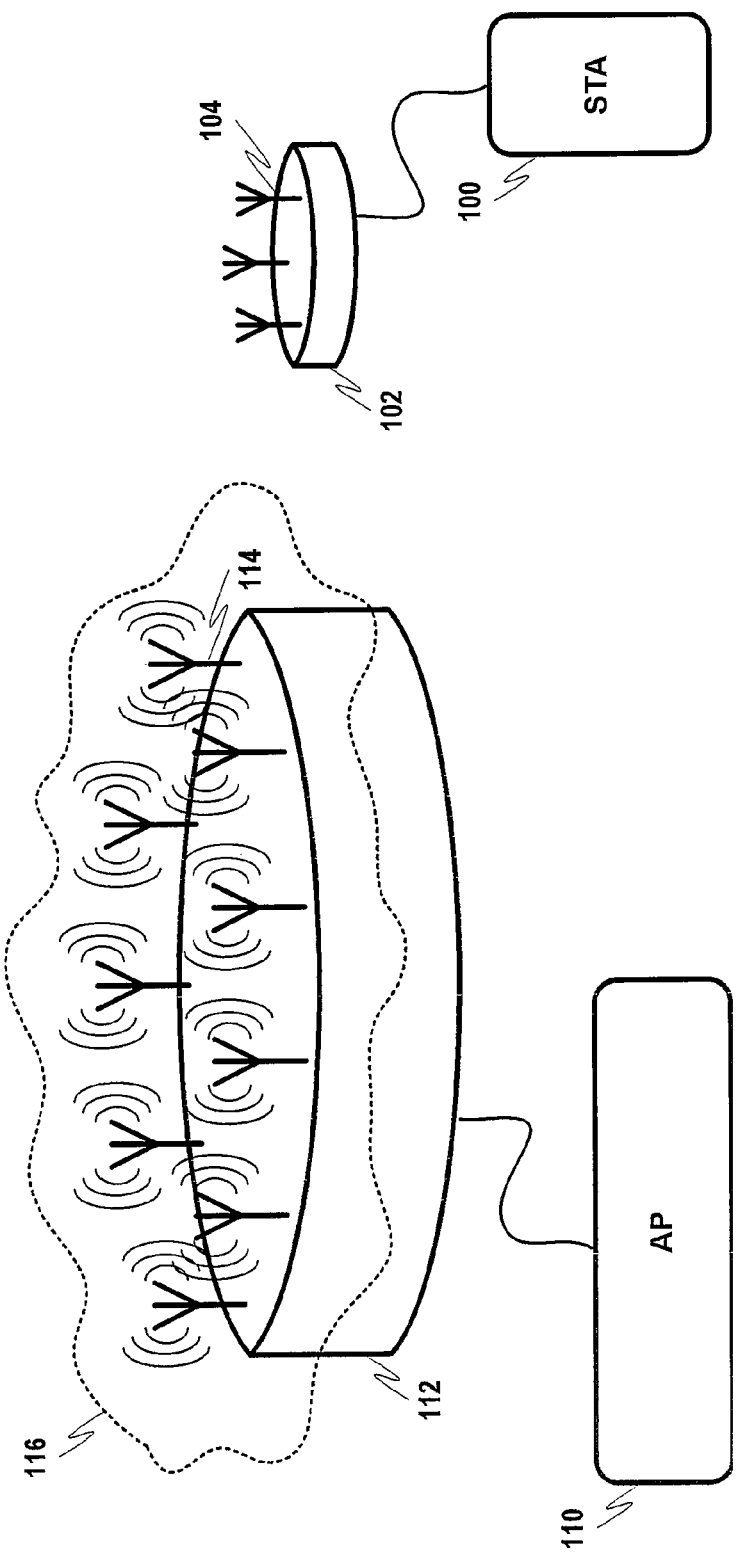

FIG. 7

Beam Training feedback IE

| Element ID | Length | Best DL beam ID | Feedback per BSTS module | Signal quality feedback | Termination of beam training |
|---|---|---|---|---|---|

700

ASYMMETRIC BEAM STEERING PROTOCOL

BACKGROUND

1. Field of Invention

Various example embodiments of the present invention relate to configuring wireless communication, and in particular, to adjusting antenna systems to select directional communication beams for enhancing wireless communication quality.

2. Background

Recent interest in the development of very high-speed wireless networks for short range communication has been fueled by the increase in emerging broadband applications such as a wireless high-definition multimedia interface (HDMI), gaming interfaces, high-speed backhaul and content distribution services, etc. The 60 GHz millimeter band (mmWave) has been targeted for the implementation of such high speed and/or capacity wireless networks due to the worldwide availability of huge unlicensed spectrum in this band. For example, emerging very high throughput wireless local area network (VHT WLAN) standards are currently aiming at very high throughput targets over 1 Gbps data rates.

However, there are many challenges to implementing an architecture in the mmWave band. For example, potential radio designs will be impacted by link budget constraints. In particular, compared to lower frequency band systems, the coverage range in the mmWave band is severely limited by very high free space propagation loss, higher penetration, reflection and scattering losses and atmospheric oxygen absorption that will be experienced by communication carrier waves operating within this spectrum.

Greater sensitivity to environmental influences may impact the operational efficiency of communication in the mmWave band. Overall wireless signal quality may suffer (e.g., unstable connections and lost packet retransmission may noticeably impact communication performance, as well as other systems relying upon these resources), and therefore, any capacity benefits that could be realized by operating in the 60 GHz band may therefore be somewhat nullified by poor communication performance. At least the above operational impediments should be overcome before wireless communication in the mmWave band will be deemed robust enough for mainstream use.

SUMMARY

Example implementations of the present invention, in accordance with various embodiments, may be directed to at least a process, computer program, apparatus and system for configuring antenna systems for selecting directional communication signals corresponding to other apparatuses. A directional communication signal may be selected as the result of a beam training operation coordinated between at least two apparatuses. Beam selection training sequences may be broadcast from an apparatus, and receiving apparatuses may determine a quality for each received beam training sequence. The quality for each beam training sequence may be used in various situations including, for example, selecting a suitable beam for directional communication, for approximating the direction from which the signals were received for beam steering purposes, etc.

In accordance with at least one embodiment of the present invention, an apparatus (e.g., an access point) may be able to provide beam selection training sequences to one or more other apparatuses (e.g., portable wireless devices). Beam training may be activated by either training signal sources or apparatuses to be trained. For example, an apparatus may initiate a beam training process in connected device on a periodic basis. The periodic activation of beam training may be triggered by, for instance, an information element contained in beacon signals broadcast by an access point. An alternative scenario may comprise initiation of a beam training operation by apparatuses desiring to select a communication beam corresponding to a source apparatus (e.g., an access point). The desiring apparatus may send a request to the source apparatus, which may respond by providing one or more beam selection training sequences for use in beam selection.

The beam training process may comprise a source apparatus transmitting multiple beam selection training sequences to other apparatuses. Receiving apparatuses may determine a quality level for the received sequence. In at least one embodiment of the present invention, the quality may be compared to a threshold level. If the quality of the received signal does not meet, exceed, etc. the threshold level, then corrective action may be implemented, such as requesting additional beam selection training sequences. Upon the determination that quality requirements pertaining to the received beam training sequences have been met, a beam for communicating with the particular source device may be selected based on, for example, the highest measured quality. In subsequent communication between the apparatuses, both of the apparatuses may utilize the selected beam in order to adjust their antenna systems, which may increase the quality of the interaction.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

Various example embodiments of the present invention may be understood from the following detailed description and example implementations taken in conjunction with the appended drawings, wherein:

FIG. 1A discloses examples of apparatuses interacting via wireless communication in accordance with at least one embodiment of the present invention.

FIG. 7 discloses an example of a message that may be employed in a beam training process in accordance with at least one embodiment of the present invention.

DESCRIPTION OF EXAMPLE EMBODIMENTS

Figure 1B:
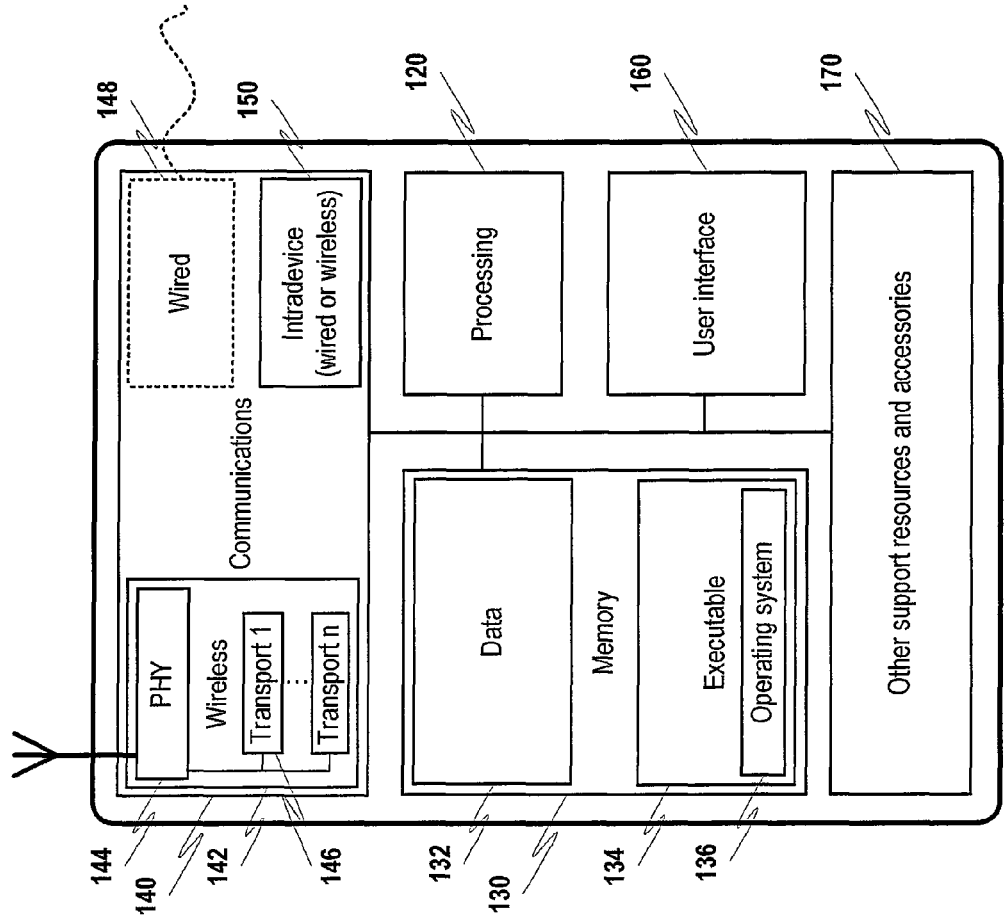
FIG. 1B discloses an example of a functional layout corresponding to the apparatuses previously described in FIG. 1A.

While the present invention has been described below embodied in terms of one or more implementation examples, various changes can be made therein without departing from the spirit and scope of the invention, as described in the appended claims.

I. Interaction Scenario

To overcome potentially huge path losses that may be experienced when implementing, for example, a 60 GHz radio architecture, beamforming techniques for adjusting multi-element antenna systems at both the transmission and reception sides may become very important. In many channel environments, the lack of significant scattering or richness in multipath operation may reduce the applicability of traditional multiple input-multiple output (MIMO) spatial multiplexing schemes in an effort to increase the spectral efficiency. As a result, simple beamforming techniques with the objective of transmitting and receiving towards the best beam-direction in order to maximize the signal to noise ratio (SNR) for single spatial data stream are required. Given the much smaller wavelength (e.g., 5 mm for 60 GHz) in this band, a substantial number of antenna elements can be constructed in a relatively small area that can further be integrated with other RF components in the RF front-end. To extend the range of coverage, these antenna systems may be equipped with beam steering capability to focus upon the best direction of transmission and reception.

FIG. 1A discloses an example comprising two apparatuses that will be utilized herein to explain various example implementations of the present invention. While two devices including access point (AP) 110 and station (STA) 100 are shown in FIG. 1A, the different embodiments of the present invention are not specifically limited to this configuration, and may be applied in scenarios wherein more devices are interacting. Furthermore, situations may also exist where one of the apparatuses takes the role of AP only temporarily, for example, in an ad-hoc networking environment where the roles of the participating apparatuses are constantly changing. In addition, AP 110 and STA 100 are shown coupled to external antenna systems 112 and 102, respectively. While these antenna systems have been shown as entities separate from each apparatus, this representation has been used merely to facilitate the disclosure of the various embodiments of the present invention. As set forth above, antenna systems for use in, for example, the 60 GHz band may also be implemented in a more compact configuration (e.g., as part of a integrated circuit or chipset) that may incorporated within each apparatus.

Each antenna system may include a plurality of antennas (e.g., shown at 114 and 104). The number of antennas in an antenna system may depend on the characteristics of an apparatus. For example, restrictions in apparatus size, power, processing, etc. may dictate the number of antennas that can be supported in an apparatus. Some or all of the antennas 114 and 104 in antenna systems 112 and 102 may be active at any given time, which may result in a communication signal, represented for example in FIG. 1A at 116. In the configuration shown in FIG. 1A, signal 116 is operating in a multidirectional mode. There may also be instances where the antenna system may comprise, for example, a switched set of directional fixed-beam antennas.

Now referring to FIG. 1B, an example device configuration in accordance with at least one embodiment of the present invention is disclosed. For instance, the basic layout disclosed in FIG. 1B may be applied to one or both of the example apparatuses disclosed in FIG. 1A. Processing section 120 may comprise one or more data processing components such as microprocessors, microcontrollers, discrete logic circuits, field-programmable gate arrays (FPGA), etc. Processing section 120 may be configured to perform various activities in an apparatus, including operations utilizing input data, yielding output data, triggering actions in the apparatus, etc. These operations may include, but are not limited to, arithmetic manipulation, conversion, compilation, interpretation, etc. Information used in, and created by, these activities may be stored in memory 130, which may communicate with processing section 120 via wired or wireless a communication bus.

Memory section 130 may incorporate different types of static or dynamic memory. For example, read-only-memories (ROM) and random access memories (RAM) may be made up of components from an array of available technologies such as magnetic, optical and electronic memory mediums. Memory components may further be fixed in an apparatus, or may be removable from the device in order to support data storage, loading, transfer, backup, etc. The types of information that may be stored in memory 130 may include at least data 132 and executable 134. The types of information in data 132 may include databases, text, audio and/or video (e.g., multimedia), etc. Processing section 120 may utilize executable information 134 for carrying out various activities in an apparatus, including operations using data 132. For instance, operating system 136 may comprise at least one executable program configured to provide baseline operation for the apparatus.

In at least one example implementation, processing section 120 may access information stored in memory 130 when interacting with communications section 140, which may comprise at least wireless support 144 and intra-device support 150. Wireless support 140 may include resources corresponding to one or more wireless transports 142 that may access resources in physical layer (PHY) 144, such as an antenna or antenna system and corresponding support hardware, in order to communicate wirelessly with other apparatuses. Intra-device support 150 may include wired and/or wireless resources for conveying data between different sections of the apparatus. Communications 140 may optionally include resources corresponding to other forms of communication, such as wired communication support 148. Wired support 148 may comprise, for example, any hardware and/or software required for coupling to a wired communication medium.

Apparatuses usable with various embodiments of the present invention may further include user interface functionality 160, as well as other support resources and accessories 170, depending on the configuration of a particular apparatus, the use for which an apparatus is intended, etc. For example, AP 110 would not necessarily require extensive user interface functionality, but may include features such as battery backup, security features, etc. On the other hand, portable wireless devices may require a more extensive user interface (e.g., including displays, keypads, speakers, pointing devices, microphones, etc.) as well as other resources related to desired user functionality.

II. Beam Forming

In the mmWave band, multiple stations may utilize beamforming to extend their range. The approach described with respect to various embodiments of the present invention may provide efficient solutions to training overhead by asymmetrically providing the possibility for beam-selection training facilitated by an apparatus acting in an AP role while still supporting beam-steered transmissions under carrier sense access with collision avoidance (CSMA/CA) medium access. Such beam steering schemes may utilize physical layer protocol data units (PPDUs) for performing beam training with stations in a basic service set (BSS) so that the stations can steer their signals to the right direction while communicating to the AP.

Figure 2:
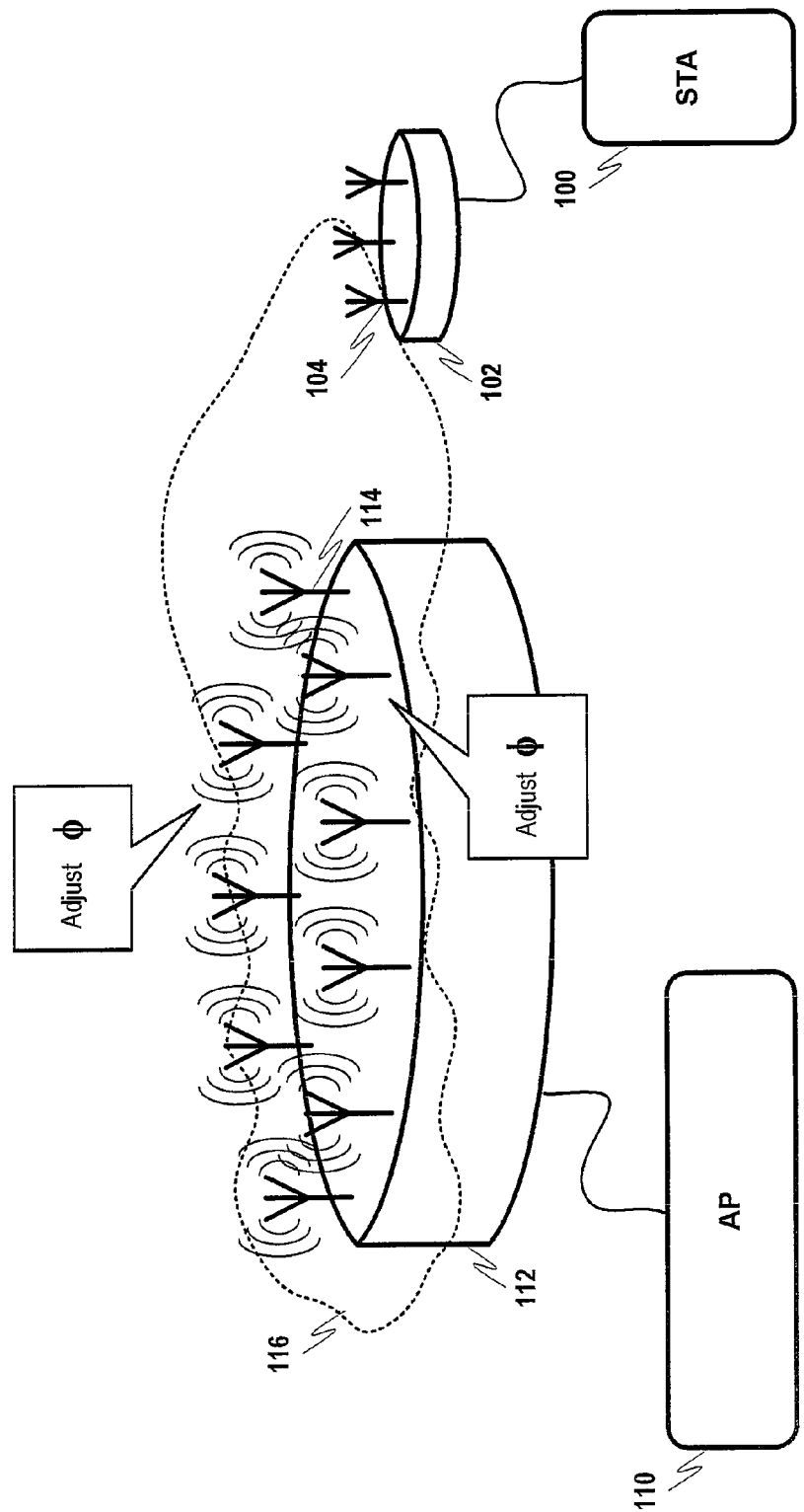
FIG. 2 discloses an example of beam forming by adjusting the phase of an antenna system in accordance with at least one embodiment of the present invention.

In accordance with at least one embodiment of the present invention, the transmission of training signals from the centralized AP may be facilitated to assist the beamforming capable stations for directional beam steering and selection. To increase the range of coverage, 60 GHz WLAN AP 110 and STA will both likely be equipped with multi-element antenna systems with beam steering control mechanisms, an example of which is shown in FIG. 2. High directional antenna gains at both ends may be utilized to overcome the substantial path loss common in mmWave band. Due to smaller wavelength (5 mm in 60 GHz), it is possible to integrate a large number antenna elements, in a linear or planar array configuration, in a smaller area integrated to the RF front end. As shown in FIG. 2, one or more antennas in an antenna system may be adjusted to create constructive interference between signals emitted from these antennas. The constructive interference may result in a new waveform having the combined amplitude of the original waves in a particular direction (e.g., as shown at 116 in FIG. 2) that forms a communication "beam" in that direction.

III. Beam Training

Figure 3:
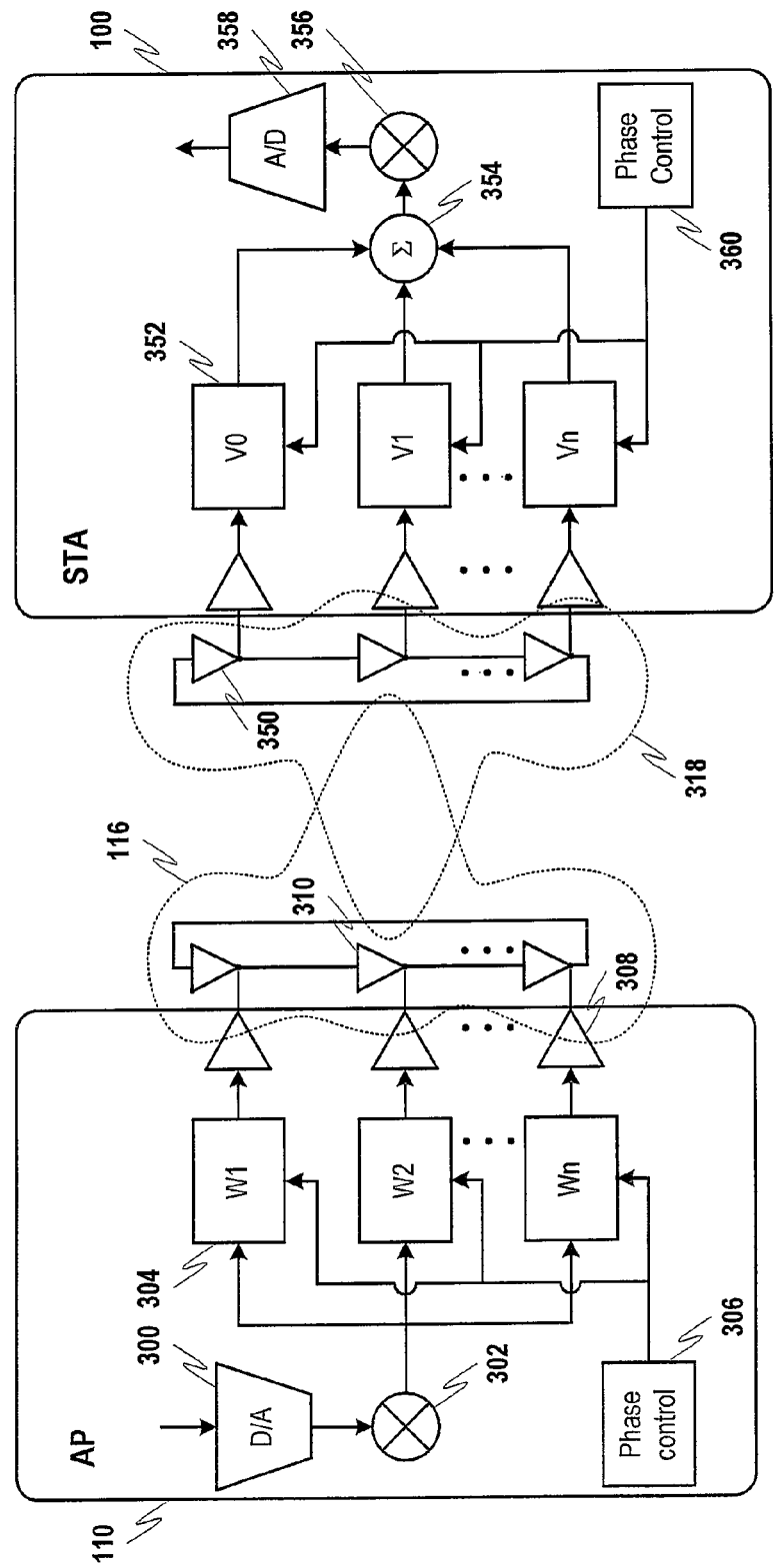
FIG. 3 discloses an example interaction of apparatuses including adjustable antenna systems in accordance with at least one embodiment of the present invention.

A example of a system for configuring a communication beam is disclosed in FIG. 3. Digital information in AP 110 may be converted to analog signal information in digital to analog converter (D/A) 300. The analog signal information from D/A 300 may be combined into a signal analog signal for transmission in summing element 302. In array beamforming, the phases of the feed input signals to multiple antenna elements are controlled using a predefined weight vector w (as shown at 304) and at the transmitter and v (as shown at 352) at the receiver. Phase controls 306 and 360 may adjust the gain vectors 304 and 206 to maximize antenna gains towards the desired direction of transmission and reception.

The analog signal may then be sent from antenna elements 319 to antenna element 350. As shown in FIG. 3, various embodiments of the present invention may use beam training to direct signals 116 and 318 in a particular direction in order to maximize the quality of the signal. The signal information may then be summed and combined by elements 354 and 356 in STA 100, the resulting analog information being converted back into digital information for use by STA 100 by analog to digital converter (A/D) 352. The transmission energy may be focused to line of sight or stronger reflection paths, whereas, other multipaths become attenuated. The set of beamforming vectors used depends on the array geometry such as linear, circular or planar arrays and the desired beam direction. For practical implementations, beam switching by integrated RF phase shifters may be used in mmWave band. For example, phased arrays may be designed to include beamforming control resources that are configured to steer the beams from a set of multiple fixed beams. Such open loop schemes may be attractive for implementation in 60 GHz WLAN systems due to their simplicity and low-cost. These benefits may be realized since the feedback of channel information from the receiver will not be required.

Before AP 110 and STA 100 may start transmitting data in accordance with a directional communication beam, the highest quality transmit and receive beam directions have to be estimated during an initial training phase. Example configurations in accordance with at least one embodiment of the present invention are described below.

IV. Example Operational Embodiments

In accordance with at least one embodiment of the present invention, the following example configuration is considered for the sake of explanation: (1) a WLAN basic service set (BSS) may consist of AP 110 capable of forming fixed beams towards a fixed number of beam pointing directions; (2) In some cases, AP 110 can generate large beam widths covering a sector, wherein sectors may comprise multiple smaller beams over the azimuthal angular span of the sector; (3) The channel access mechanism in the BSS is carrier sense multiple access with collision avoidance (CSMA/CA). AP 110 can reserve the medium by setting the network allocation vector (NAV) to be large enough to allow for beam-training. In addition, training PPDUs, or training packets, also indicate the length of the training period in a signaling field so that stations operating in a directional receive mode can determine the length of ongoing beam training period; (4) Transmission and reception by a station in WLAN are assumed in time division duplex (TDD) mode, and reciprocity of the downlink and uplink channels are assumed; (5) Training PPDUs are transmitted from AP 110 to the stations, which may use any scheme (e.g., manual/semi-automatic or adaptive methods) to assess the desired direction for beam reception and transmissions. To facilitate detection, the number of beam training PPDUs required by STA 100 may be communicated through beam forming capability information during association/re-association signaling; and (6) For transmission of the beacon and some management frames, a robust omni-directional signal bearer (OSB) is available that may cover the transmission range over the BSS. The OSB can be realized by using a very low modulation order and coding rate together with high spreading rate to assist during beaconing, associations, probe request/response, medium reservations and initiation of beam-steered transmissions for stations in the BSS.

In accordance with various embodiments of the present invention, at least two different schemes may be utilized for transmitting beam selection training sequences and associated beam steering transmissions. These schemes are not mutually exclusive. For instance, it is possible for a wireless communication system (e.g., a WLAN system) to employ either or both schemes depending on traffic load and capabilities of AP 110.

V. Scheduled Beam Training

In the initial scheme, scheduled transmissions of beam selection training sequences (BSTS) may be provided from AP 110 in downlink. During the training phase, participating stations may receive the beam training PPDUs (referred to herein as BTPs) and may record the signal quality for different beams. The number of BTPs transmitted during training sequences can vary, but should at least be sufficient to adaptively compute a beam steering vector, or to allow manual, semi-automatic or automatic steering towards different receiving directions. The only indication required from STA 100 for its internal beam acquisition method is the minimum number of BTPs per beam training sequence communicated to AP 110, for example, in the beam forming capability information field. Since multiple STA 100 can simultaneously receive and utilize the same beam training signal, the training overhead may be reduced. The exchange of signal information for supporting beam selection training may operate asymmetrically. For example, BTPs from AP 110 may be transmitted in a single transmission opportunity (TXOP) period, but testing, acknowledgement and initiation of communication in STA 100 based on the results of beam training may occur in subsequent TXOP periods when STA 100 and AP 110 are allocated at least one time period during which channel access is allowed.

For instance, AP 110 may announce beam training schedules for the beams that it supports in accordance with the interference protection provided by a CSMA/CA contention-based initiation channel. Due to the flexibility of allowing the beam reception, testing and initiation steps of beam-steered transmissions to occur during different TXOP periods, the training and associated signaling overhead may be significantly reduced.

Beam training schedule information, along with other related parameters, may be included in a beam training information element (BTIE) transmitted as part of a beacon frame after which beam-training will follow. In this beacon-based scheduled method, the transmission of beam training sequences may start after a predefined interval (e.g., minimum duration defined by at least the short interframe space (SIFS) time period) at the end of a beacon frame. Beam training schedule periodicity may be established, for example, as a predefined number of beacon periods, Nbeacons, or may be set by AP 110 based on the number of associations completed with beam-reception capable STAs 100. Scheduled (or beacon-assisted) beam-training schemes may be asymmetric, wherein only functionality for beam steering in AP 110 is defined. Algorithms governing how STAs 100 may steer its beams based on received BSTS may be implementation specific. STAs 100 may use manual, semi-automatic or adaptive tracking select a reception beam.

Figure 4:
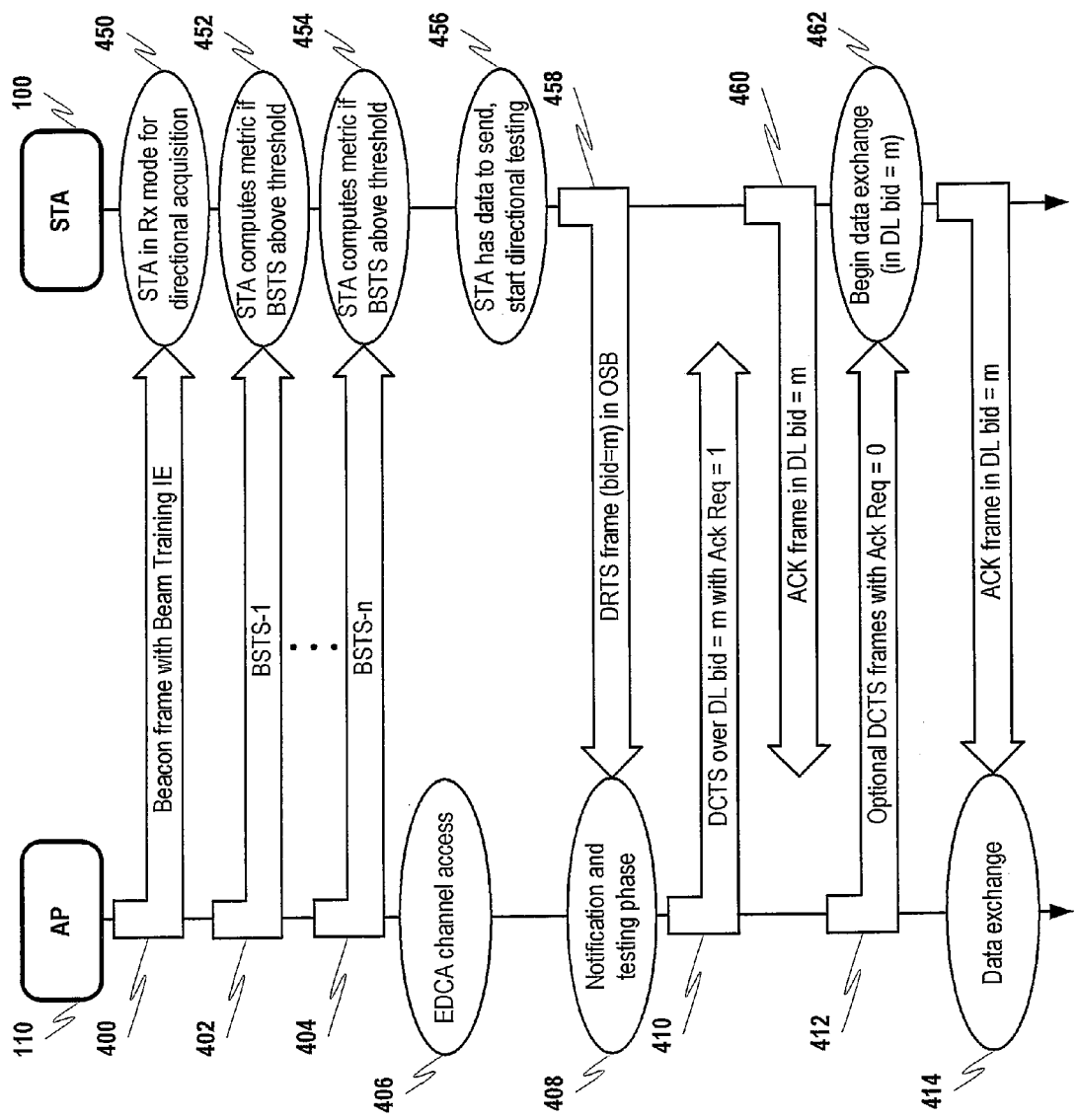
FIG. 4 discloses an example of a stepwise apparatus interaction in accordance with at least one embodiment of the present invention.
Figure 5:
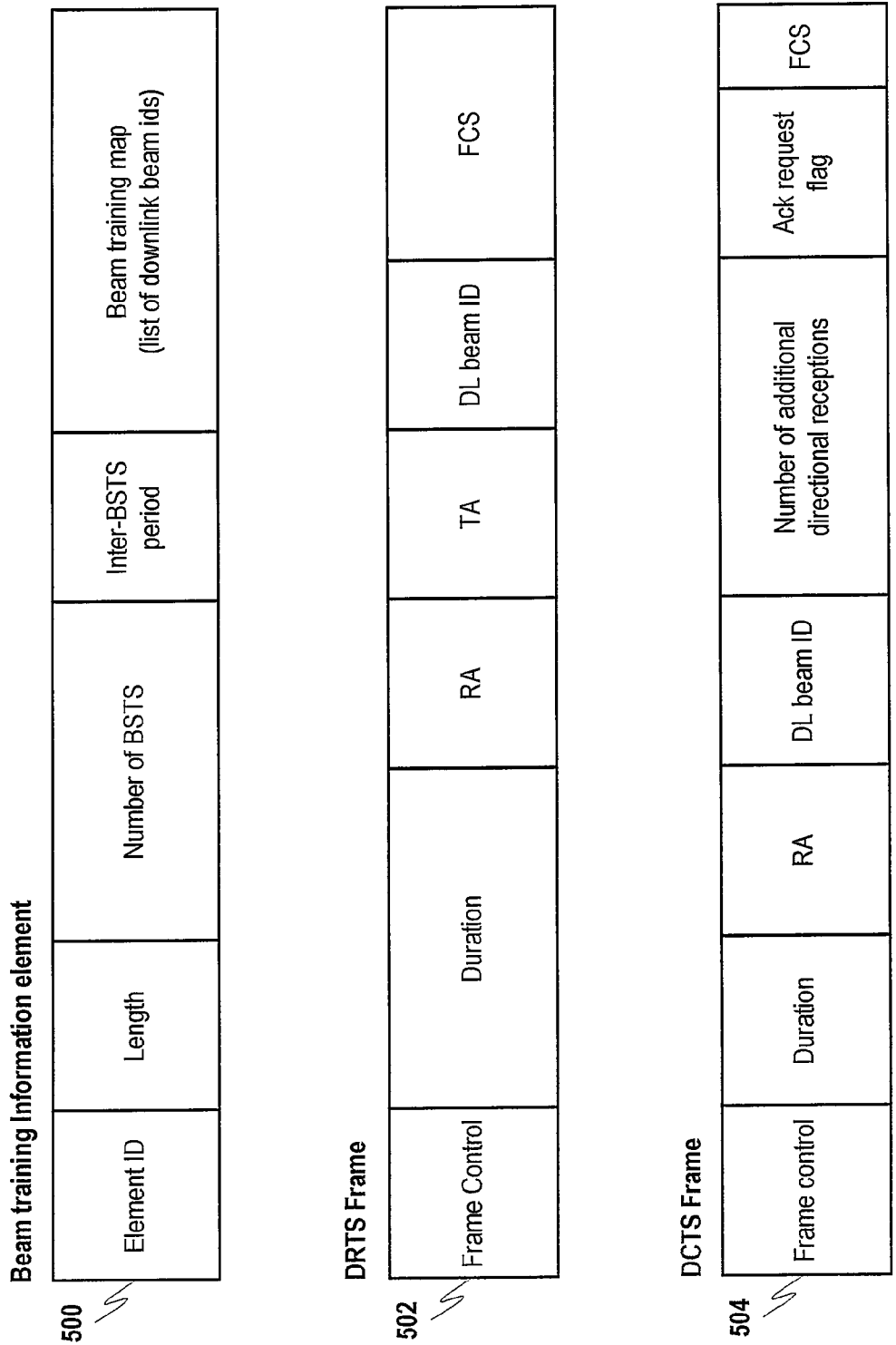
FIG. 5 discloses examples of messages that may be employed in a beam training process in accordance with at least one embodiment of the present invention.

Now referring to FIG. 4, an example beacon-assisted interaction between AP 110 and STA 100 is now disclosed. Initially, the transmission of beam training schedule and parameter information from AP 100 may occur at 400. For example, AP 110 may broadcast information regarding scheduled beam training transmissions using a BTIE within the beacon frame. An example BTIE 500 is disclosed in FIG. 5. BTIEs may include, but are not limited to, parameters such as: NBSTS—number of beam selection training sequences; NBTP—number of BTP per BSTS; TIBP—inter-BSTS period, which can be fixed by AP or can change for scheduled and unscheduled operations; and beam-training Map information including a list of downlink beam training IDs.

The duration of training PPDUs inside a beam-training sequence may be equal, which is also known by STA 100. A fixed interval, for example a time for inter-BSTS period (TIBP), between each BSTS may assist BSTS reception by STA 100 and switching from one direction to another in AP 110. When BSTSs to be transmitted do not belong to the sequential beam identifiers (e.g., downlink beam identification (DL beam ID)), AP 110 may include a beam-training map to indicate the sequence of DL beam IDs to be used for training. AP 100 may predefine maximum values corresponding to a number of BTP per BSTS during scheduled (and unscheduled) beam training schemes denoted as, $N_{BTP}^{max,sch}$ and $N_{BTP}^{max,unsch}$, respectively. Similarly, based on the particular algorithm being used, STA 100 may also indicate a minimum number of BTP needed for directional beam steering as parameters, $N_{BTP}^{min,sch}$ and $N_{BTP}^{min,unsch}$. AP 110 may then utilize the value of the $N_{BTP}$ for scheduled beam selection training as, $N_{BTP}=\min(N_{BTP}^{max,sch},\max\{N_{BTP}^{min,sch}(STA-1),\ldots N_{BTP}^{min,sch}(STA-N_s)\})$. The response to receiving the beacon at 400, STA 100 may enter a receiving (Rx) mode in preparation for directional acquisition determination as shown at 450 in FIG. 4.

After the initial omni-directional beacon frame transmission shown at 400, AP 100 may begin transmitting beam-steered training sequences based on the beams scheduled for beam training (402-404), wherein each beam has a fixed number of BTPs. After sending a sequence of BTPs, AP 110 may proceed to send the next sequence of BTPs. Training sequences are the same except for beam forming operations occurring in each STA 100. As set forth above, at the beginning of the beam training period, each beam-reception capable STA 100 may enter a receive mode and starts the process of beam acquisition. Different receiving apparatuses may be using different algorithms to detect the beam signal and compute the received signal quality (452-454). For example, one method may include sweeping the receive direction for the duration of each BTP and determining a best metric (e.g. direction of arrival) based on the quality of each reception.

At the end of the beam training period, AP 110 or STA 100 may proceed with channel access procedures (e.g., for example as shown at 406). When AP 110 or any STA 100 have data to be transmitted (e.g., 456), and if STA 100 is beam steering capable, the transmitting STA 100 may initiate beam selection notification and testing process (458 and 408). Control frames named as "Directional Request to Send (DRTS)" and "Directional Clear to Send (DCTS)" may be considered herein to provide mechanisms for initiation of directional transmissions and medium reservation to protect directional data transmissions. Example structures that may be utilized for DRTS frames and DCTS frames are disclosed in FIGS. 5 at 502 and 504, respectively.

When STA 100 has data to transmit it will first need to obtain permission to access the wireless communication medium granted by clear channel assessment (CCA) and NAV expiry. STA may then send a DRTS frame using OSB at 458. This frame may include information on the desired downlink (DL) beam ID and required duration, up to the TXOP limit, with rules that may be governed, for example, by the enhanced distributed channel access (EDCA) operation. Once AP 110 receives the frame at 408, it may respond with the beam-formed DCTS frame over the requested beam ID at 410, and then may enter a receive mode oriented towards the beam direction. After STA 100 receives the DCTS frame it may transmit a directional acknowledgement (ACK) frame to the AP as shown, for example, at 460.

Depending on existing traffic, AP 110 may need to extend the medium protection for other stations in directional receive modes. In this case, AP 110 may first respond to STA 100 with a DCTS frame in its beam ID that has a value for the more directional repetitions (More Dir. Repetitions) parameter (for example as shown at 412). The more directional repetitions parameter may indicate a number or duration of DCTS transmissions that AP 110 still has to make in view of current traffic conditions. AP 110 may then enter the reception mode to await a directional ACK frame from the STA 100. After sending the ACK frame, STA 100 may delay its transmission by the DCTS duration defined in the more directional repetitions parameter before it proceeds with the transmission of data. Upon receipt of an ACK frame, AP 110 may continue to transmit DCTS frames in support of beam training with stations other than STA 100.

Stations receiving DCTS frames may set their NAV values according to the duration for the indicated more directional repetitions of DCTS plus the value set in the duration parameter. In an example scenario where AP 110 initiates DL data transmission, a similar sequence of steps may be used. In the case of a failure, for example when STA 100 does not receive the DCTS in response to its DRTS, it can send DRTS frame using an alternate beam ID, or alternatively, it may indicate its request to initiate a beam tracking phase by using an unscheduled beam training scheme as shown, for example, in FIG. 6.

Following the successful testing of the beam acquisition performed in the above step, data transmission using the determined directional beam will be carried out over the duration indicated in the duration field of the DCTS frame as shown at 462. For medium protection against stations in hidden beam regions, directional transmissions may utilize the previously described DRTS/CRTS mechanisms in subsequent transmissions. After beam steering is complete, the exchange do not require ACK frame from requesting STA after the DCTS frame (the ACK request field is set to 0). Some STA 100 may just try to receive BSTS sequences that can be acquired (e.g., BSTS sequences that are above a certain quality level). STA 110 may use this information to request a specific (e.g., reduced) beam training sequence using unscheduled training scheme.

The approach used in the above scheme may also be employed in modified forms, in accordance with various embodiments of the present invention, which may essentially provide similar functionality to the mmWave WLAN system. At least one implementation variant may include scheduling information transmitted using a beam training (BT) schedule management frame. Alternatively, the entire BT IE can be transmitted inside the BT Schedule management frame, in which case AP 110 may transmit a BT Schedule frame at any time based on its history of association with other apparatuses, requests from other stations, etc. Similar to the above, The BT schedule frame may provide information of the beam-training schedule and necessary parameters.

In another example configuration scheduled beam training may only be used for the purpose of coarse beam training. In particular, AP 110 may only employ scheduled beam-training for the purpose of coarse beam training covering sectors or certain beam-groups only. For this case, the number of BSTSs may be set in accordance with the maximum number of beam-group or sectors, while the other parameters are set to a lower value. The stations can also use unscheduled beam training requests for higher flexibility when large number of BSTSs and higher parameter values would be supported.

VI. Unscheduled Beam Training

Conditions may exist when scheduled or beacon-assisted beam training is not received by STA 100 (e.g., when STA 100 is not awake for a beacon due to being in power save mode, could not acquire the best beam, or was out of range of AP 110), STA 100 can make a request for a unscheduled beam selection training sequence from AP 110. This example method may also be applicable to stations operating in an ad-hoc mode.

Figure 6:
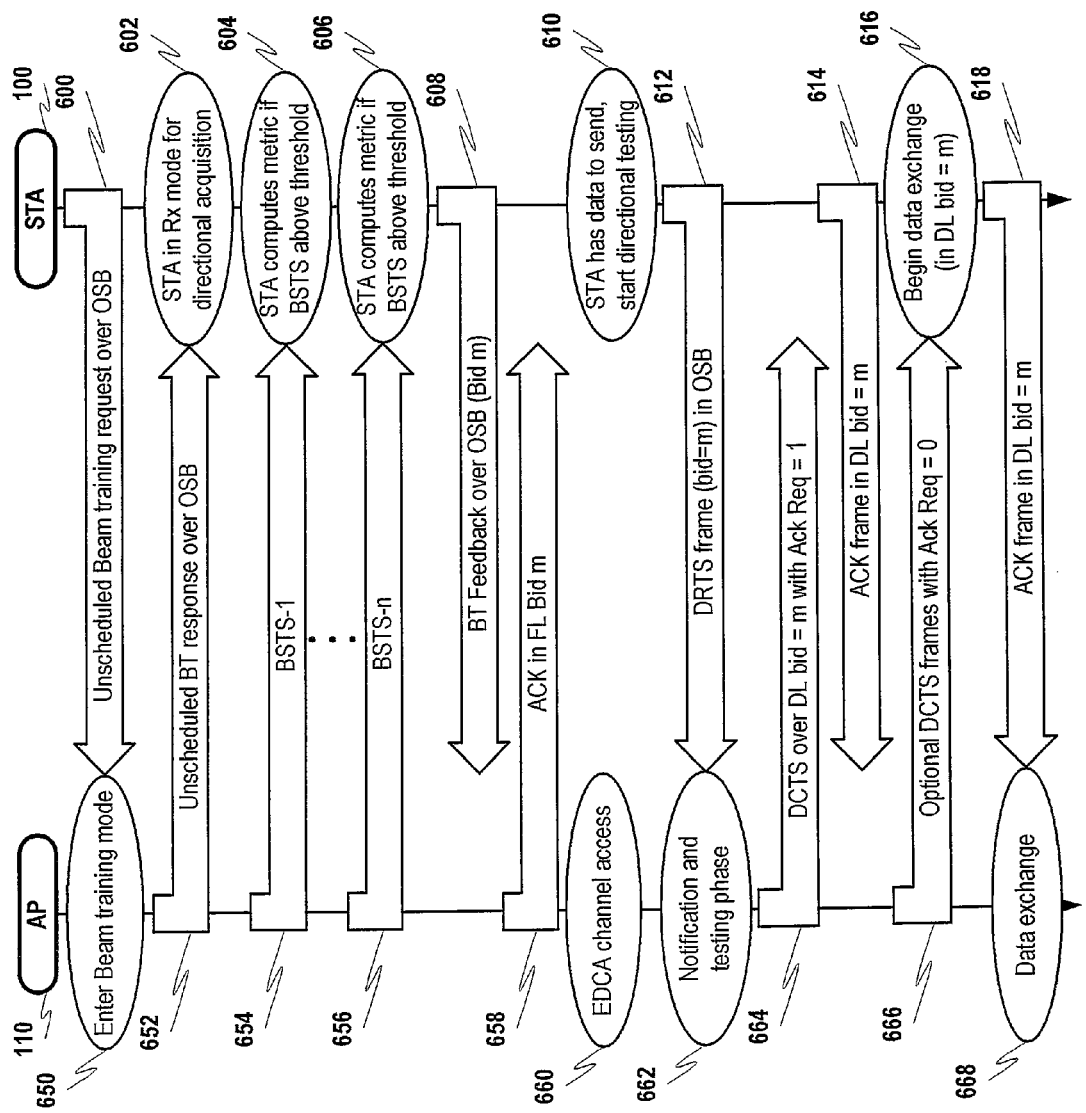
FIG. 6 discloses an alternative example of a stepwise apparatus interaction in accordance with at least one embodiment of the present invention.

An example of unscheduled beam training between two apparatuses is disclosed in FIG. 6. In accordance with at least one embodiment of the present invention, an unscheduled beam training request may be sent from STA 100 to AP 110 at 600. STA 100 may be permitted to access the communication medium upon CCA and NAV expiry, and may then transmit its request for the initiation of unscheduled beam training using an unscheduled beam-training request management frame over a robust omni-directional signal bearer. This message frame may include at least an unscheduled BT IE comprising, but not limited to, the following parameters: $N_{BTP}^{min,unsch}$—minimum number of BTP per BSTS required for its internal beam acquisition; preferred training mode—all BSTS first mode or feedback per BSTS mode; and a beam training map comprising a list of downlink beam IDs requested for BSTS.

The previous scheme wherein beam training is initiated by AP 110 may move sequentially from one BSTS to another without waiting for any feedback from STA 100. However, if operating in a BSTS feedback mode, AP 110 will wait in receive mode in that beam direction until feedback is received from the STA 100. When STA 100 has already acquired BSTS of some DL beam ID set, but is experiencing high packet loss in directional transmissions when using this particular beam ID, STA 100 can send a beam training map containing the list of downlink beam IDs requested for beam selection training, which can also be used for beam-tracking.

When AP 110 can grant a request immediately (e.g., enter a beam training mode shown at 650), it may acknowledge the request with an unscheduled beam-training response frame in OSB with the immediate BT field set to "true" at 652. By setting the duration of the frame, AP 110 may reserve necessary time for the transmission of a BSTS to follow the current frame. In order to communicate relevant parameters to STA 100, a response frame may also contain a BT IE field as previously described above with respect to scheduled beam training. In certain instances, AP 110 may delay a beam training request, or may not support a requested BT request, due to its inability to support the parameters requested for training. AP 110 may then respond with setting the immediate BT field of the IE to "false" along with an associated reason code for the cause.

Following the granting of unscheduled beam training for STA 100, AP 110 may start transmitting beam steering training sequences for all of its DL beam IDs (shown for example at 654-656). Transmissions may depend on the requested method (e.g., the BSTS mode described above or via a mode requiring feedback). Also, when the request was over a fixed set of beam IDs, the AP will only transmit the requested beam IDs.

At the beginning of a beam training period, each beam-receive capable stations may enter a receive mode as shown at 602 and may start the process of beam acquisition (604-606). Different receiving apparatuses may utilize different algorithms to detect the beam signal and compute the received signal quality. For signal quality assessment (SQA), STA 100 can utilize methods such as: (1) receiving multiple BTPs from AP 110 during which STA 100 can switch its receive beam directions to detect best direction; (2) using received BTPs to estimate a direction of arrival for the BTPs, which may indicate the best direction, or alternatively, STA 100 may adaptively track a beamforming weight vector.

Under normal operation using a BSTS feedback mode, STA 100 may send feedback to the AP in "BT feedback" frames using, for example, a robust omni-directional signal bearer after the end of the training phase as shown at 608. This feedback may indicate the best beam ID for its reception along with other parameters. AP 110 may respond with a directional ACK frame by its beam steered to the requested beam as shown at 658. Under beam training using feedback per BSTS mode, STA 100 will switch to transmit mode at end of each BSTS if it was able to receive the sequence and transmits "BT feedback" response frame over its best direction. An example beam training feedback IE 700 is shown in FIG. 7. If AP 110 receives the frame while receiving in the same direction of its sequence transmission, will record it as one successful DL beam ID for STA 110. After a predetermined number of BSTSs, STA 100 may be already satisfied with the current signal quality assessment (SQA) above certain threshold for one or more beam directions from AP 110, and it may indicate termination of beam training. AP 110 will first send a directional ACK frame to the STA 100 and then release the NAV reservation by transmitting contention free end frame after such request.

Following successful testing of beam acquisition as described in the above steps, data transmission may proceed using the desired directional beam steering similar to the example shown in FIG. 4 and in accordance with the example interaction shown at 660 to 668 and 610-618. For medium protection against stations in hidden beam regions, directional transmissions may be initiated by transmission of DRTS/CRTS mechanisms as explained with respect to the first scheme. Since directional transmission was tested already at the end of unscheduled beam training, the exchange does not require an ACK frame from requesting STA 100 after the DCTS frame (e.g., the ACK request parameter may be set to 0).

Depending on settings in AP 110, in certain cases STA 110 may implicitly indicate an unscheduled beam training request when sending the association request with beam steering capability, or AP 110 may automatically proceed with an initial unscheduled beam training response frame after the association response. However, the process may continue in same manner as described above. The unscheduled beam training process may also be used for beam tracking. In this instance, STA 100 may explicitly indicate the group of beam IDs for which it wants to receive training sequences. The decision of STA to request beam training can be based on received SNR level, when the SNR is below some threshold or based on retransmission rate for packets.

The two methods disclosed above may both be utilized in a WLAN BSS. The initial scheme may allow reference training signals to be used by multiple stations so that they can determine the best beam direction towards the AP. However, if stations want to request specific training signals from an AP, an unscheduled request may be used.

In at least one configuration, support for scheduled beam-training can be made mandatory in an AP for initially providing coarse, or sector level, training. This may help stations learn the best sector direction towards the AP. Unscheduled training may then used for fine training and beam tracking within only 1 or 2 sectors of interest.

For Orthogonal frequency-division multiplexing very high throughput physical implementations (OFDM VHT PHY), the use of NSTS short training symbols for synchronization including timing acquisition, automatic gain control convergence, and coarse frequency acquisition may be beneficial. After the short training signals field is sent, number of channel estimation symbols (NCES) may be used in a channel estimation training field (CETF) to acquire channel information. Multiple CETF symbols are required in order to assist in channel estimation during beam training. OFDM symbols using binary phase shift keying (BPSK) modulation of Golay codes or m-sequences having good auto correlation and cross correlation properties will be used to create the STF and CETF. Similar sequences without OFDM modulation are required for single carrier operation. After the end of CETF, VHT-specific signal field can be used that will help protect the directional training sequences by indicating a length of the BSTS to be used. The exact values of different parameters, and the choice of STF and CETF, depends on the channel bandwidth used, the number of subcarriers and other desired performance metrics of the OFDM or single carrier physical layer.

Figure 8A:
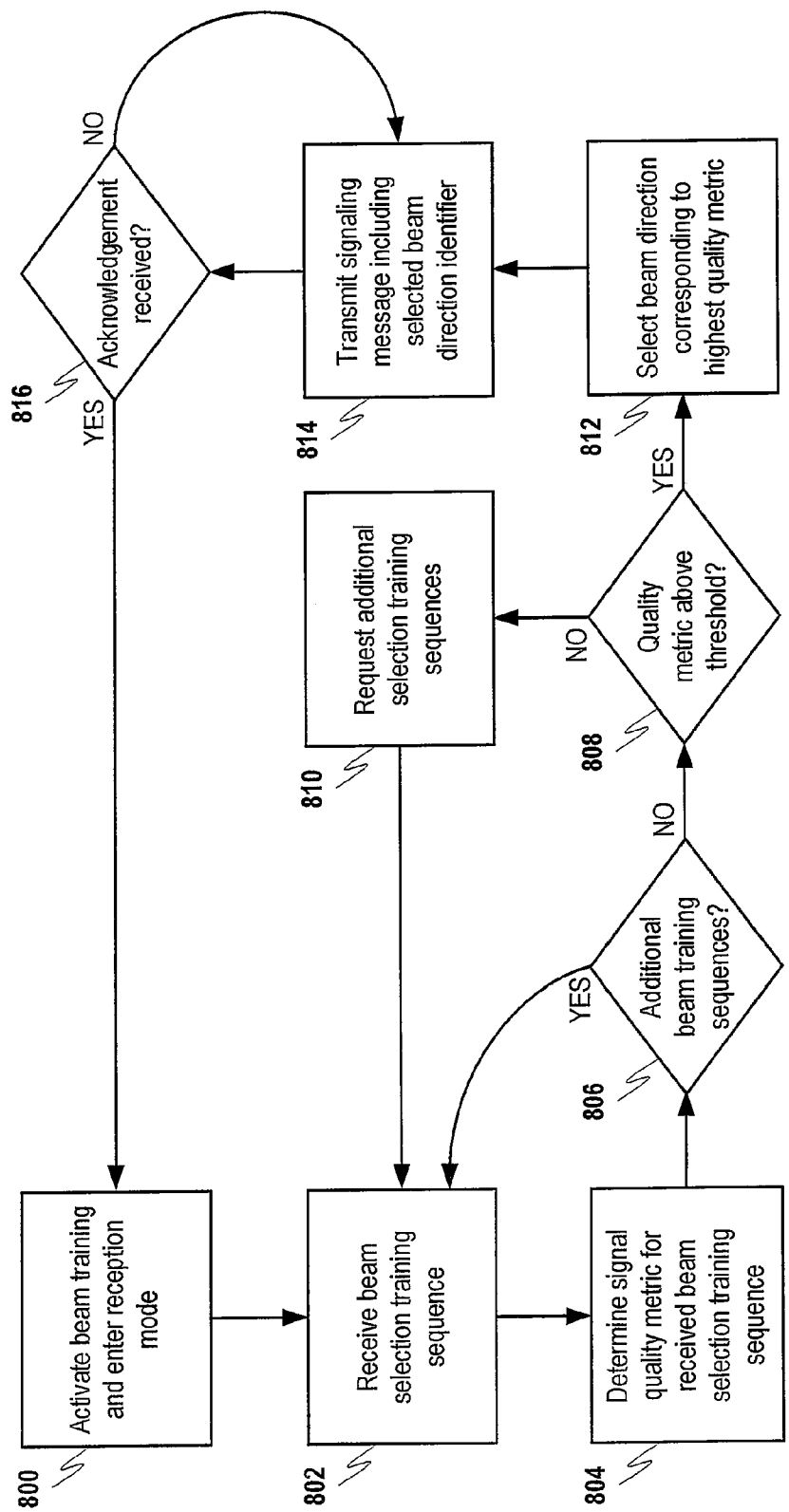
FIG. 8A discloses a flowchart of an example process of beam training from a station perspective in accordance with at least one embodiment of the present invention.

Now referring to FIG. 8A, a flowchart of an example beam training process in accordance with at least one embodiment of the present invention is now disclosed. In step 800 beam training process may be activated and the apparatus (a station in this example) may enter a reception mode. The activation may be triggered either by the source of the beam training selection sequences (e.g., AP 110) or the apparatus desiring to select a beam (e.g., STA 100) in accordance with the previous example schemes. A beam selection sequence may then be received by the apparatus desiring to select a beam in step 802. The receiving device may then determine a quality metric for the received beam selection training sequence in step 804. The measurement of signal quality may comprise, for example, the strength of the signal response created by the beam selection training sequence in an antenna system of the receiving apparatus.

In step 806 a determination may be made as to whether additional beam selection training sequences need to be sent to the apparatus undergoing beam training. If additional beam selection sequences need to be received, then the process may return to step 802 where the next sequence is received. Alternatively, if all of the needed sequences have been received in the receiving device, then in step 808 a signal quality threshold may be evaluated. For example, the signal quality metric for each received beam selection training sequence may be compared to a minimum allowed quality level. If the minimum allowed quality level is not met, then in step 810 additional selection training sequences may be requested (e.g., via the previously described unscheduled beam training scheme). Otherwise, the process may proceed to step 812 where the beam selection training sequence determined to have the highest signal quality metric may be selected to indicate the relative direction towards the sending device.

Steps 814 and 816 correspond to the receiving apparatus (e.g., a station) testing the selected beam and receiving confirmation from the training signal source (e.g., AP or another apparatus acting in that role). In step 814 a signaling message comprising at least a selected beam identifier may be transmitted from the receiving apparatus. The signaling message may be an omni-directional signal. The receiving apparatus may then wait in step 816 for an acknowledgement message to be received from the training signal source. The acknowledgement message may be a directional signal received from the selected beam direction. It should be further noted that at least steps 814-816, and in some configurations steps 808-816, may not occur immediately. There is no requirement for the messages of steps 814-816 to be sent immediately (e.g., in the same beacon period wherein the beam training sequence was received). For example, the signaling message may not be transmitted until the receiving apparatus (e.g., station) is ready to engage in further communication with the source apparatus (e.g., the station has data to transmit). After an acknowledgement message is received in the receiving apparatus in step 816, the current beam training operation may be considered complete, and the example process of FIG. 8A may return to step 800 in order prepare for the next beam training activation.

Figure 8B:
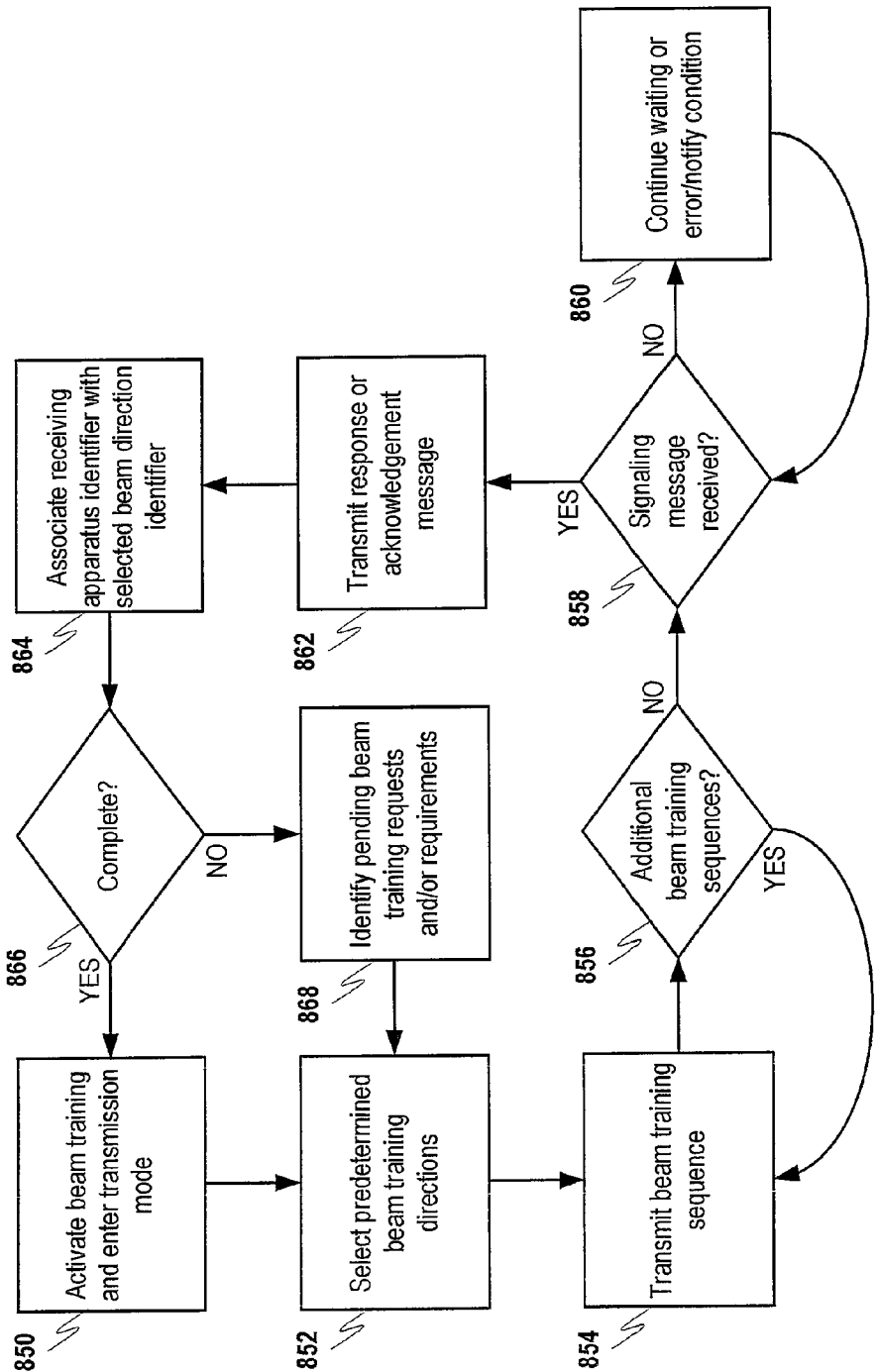
FIG. 8B discloses a flowchart of an example process of beam training from an access point perspective in accordance with at least one embodiment of the present invention.

Now referring to FIG. 8B, a flowchart of another example process is disclosed. The process of FIG. 8B represents an example of process of FIG. 8A from the viewpoint of a source apparatus (e.g., AP or another apparatus acting in that role). In step 850 beam training may be activated in a manner such as described above, and the apparatus may enter a transmission mode. The apparatus may then select predetermined beam training directions in step 852. These one or more of the selected directions will be used in step 854 to transmit a beam training sequence. Beam training sequences may continue to be transmitted in step 856 until all scheduled beam training sequences have been transmitted. The source apparatus may then enter a receiving mode for step 858.

In step 858 the source apparatus (e.g., AP) may then await a signaling message from other apparatuses (e.g., stations). The source apparatus may continue to wait in steps 858 and 860 until, for example, a threshold is met. This threshold may correspond to various values including, for example, a number of signaling messages received from other apparatuses, a duration of time passing since transmitting the beam training sequences, etc. Meeting the threshold may result in activity such as restarting the process, displaying an error notification, etc. If a signaling message is received in step 858, then in step 862 the source apparatus may transmit a response or acknowledgement. The response or acknowledgement may be sent via a directional transmission in the direction corresponding to a beam direction identifier received in the signaling message.

After the acknowledgement message is transmitted, the source apparatus may associate a receiving apparatus identifier, also received as part of the signaling message, with the corresponding beam identifier in step 864. A determination may then be made in step 866 as to whether the process is complete. The process may not be complete if, for example, time still exists for stations to respond, if additional transmit beam training sequences have been requested from other stations, etc. If the instance that the process is not complete, any pending beam training requests and/or requirements may be identified in step 868. The identified requests and/or requirements may then be carried out by repeating at least part of the process starting with step 852. Otherwise, the process may proceed to step 850 to await a subsequent activation of the beam training process.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
    activating a beam determination operation in an apparatus, wherein the apparatus enters a mode for receiving one or more beam training sequences from an access point with which the apparatus is associated;
    receiving the one or more beam training sequences in the apparatus;
    determining a signal quality metric corresponding to each of the one or more beam training sequences based on an algorithm supported in the apparatus; and
    selecting a beam direction, wherein selecting a beam direction comprises:
       transmitting a signaling message, the signaling message including an identifier corresponding to the beam direction that was determined to have the highest signal quality metric; and
       receiving an acknowledgement or response message from the direction corresponding to the beam direction identifier;
    wherein the apparatus activates the beam determination operation by sending an unscheduled beam training request message over a robust omni-directional signal bearer to the access point, and subsequently receiving an unscheduled beam training response from the access point, the unscheduled beam training response comprising at least a beam training schedule and a number of beam training packets to be transmitted per beam training sequence.

2. The method of claim 1, wherein the beam determination operation is activated by the reception of a beacon signal containing a beam training information element.

3. The method of claim 2, wherein the beam training information element comprises the scheduling information for the receiving of training sequence and number of beam training packets per sequence.

4. The method of claim 1, wherein the apparatus activates the beam determination operation by sending a beam training request message to the access point, and subsequently receiving a response message indicating support for such request.

5. The method of claim 1, wherein signal quality comprises determining the strength of a received signal in an antenna system including a plurality of antennas.

6. The method of claim 5 wherein selecting a beam direction is based on receiving at least a predetermined minimum number of beam training packets per training sequence for each supported beam.

7. The method of claim 1, wherein the signaling message and acknowledgement or response message are not sent in the same transmission opportunity period or service period in which the one or more beam training sequences was received.

8. The method of claim 1, wherein the signaling message is transmitted in an omni-directional manner and the signaling message is sent as a request to initiate directional transmission when the apparatus has data to be transmitted in a directional mode.

9. The method of claim 1, further comprising requesting a link to the access point by sending a signaling request in the direction of the selected beam.

10. A method, comprising:
    activating a beam training support operation in an access point, wherein the access point enters a mode for transmitting one or more beam training sequences;
    selecting predetermined beam directions towards which the one or more beam training sequences will be transmitted;
    transmitting the one or more beam training sequences in the selected beam directions;
    receiving one or more signaling messages, each message comprising at least a receiving apparatus identifier and a selected beam direction identifier;
    transmitting a response message or an acknowledgement message corresponding to the one or more received signaling messages; and
    associating each receiving apparatus identifier with each corresponding selected beam direction identifier for directional communications with a corresponding apparatus associated with the access point;
    wherein the beam training support operation is activated in response to receiving an unscheduled beam training request message over a robust omni-directional signal bearer and the access point responds by transmitting an unscheduled beam training response, the unscheduled beam training response comprising at least a beam training schedule and a number of beam training packets to be transmitted per beam training sequence.

11. The method of claim 10, wherein the beam training support operation is activated by transmitting a beacon signal containing a beam training information element.

12. The method of claim 11, wherein the beam training information element comprises at least a beam training schedule and a number of beam training packets to be transmitted per beam training sequence.

13. The method of claim 12, wherein the number of beam training packets to be transmitted per beam training sequence is selected based on at least one of a minimum value defined in the access point and values transmitted to the access point by other apparatuses prior to the activation of the beam training support operation.

14. The method of claim 10, further comprising receiving messages from, and transmitting messages to, the apparatus associated with the access point, corresponding to the apparatus identifier in the direction corresponding to the selected beam direction identifier.

15. An apparatus, comprising:
at least one processor, the processor being configured to:
activate a beam determination operation in the apparatus, wherein the apparatus enters a mode for receiving one or more beam training sequences from an access point with which the apparatus is associated;
receive the one or more beam training sequences in the apparatus;
determine a signal quality metric corresponding to each of the one or more beam training sequences based on an algorithm supported in the apparatus; and
select a beam direction, wherein selecting a beam direction comprises:
transmitting a signaling message, the signaling message including an identifier corresponding to the beam direction that was determined to have the highest signal quality metric; and
receiving an acknowledgement or response message from the direction corresponding to the beam direction identifier;
wherein the apparatus activates the beam determination operation by sending an unscheduled beam training request message over a robust omni-directional signal bearer to the access point, and subsequently receives an unscheduled beam training response from the access point, the unscheduled beam training response comprising at least a beam training schedule and a number of beam training packets to be transmitted per beam training sequence.

16. The apparatus of claim 15, further configured to form a directional communication beam based on the beam direction that was determined to have the highest signal quality.

17. An apparatus, comprising:
at least one processor, the processor being configured to:
activate a beam training support operation in the apparatus, wherein the apparatus is an access point and enters a mode for transmitting one or more beam training sequences;
select predetermined beam directions towards which the one or more beam training sequences will be transmitted;
transmit the one or more beam training sequences in the selected beam directions;
receive one or more signaling messages, each message comprising at least a receiving apparatus identifier and a selected beam direction identifier;
transmit a response message or an acknowledgement message corresponding to the one or more received signaling messages; and
associate each receiving apparatus identifier with each corresponding selected beam direction identifier for directional communications with a corresponding apparatus associated with the access point;
wherein the beam training support operation is activated in response to receiving an unscheduled beam training request message over a robust omni-directional signal bearer and the access point responds by transmitting an unscheduled beam training response, the unscheduled beam training response comprising at least a beam training schedule and a number of beam training packets to be transmitted per beam training sequence.

18. The apparatus of claim 17, wherein each of the one or more beam training sequences comprises an indication of a training period length that comprises the one or more transmitted beam training sequences.

19. A computer program product comprising computer readable program code recorded on a non-transitory computer readable storage medium, wherein said computer readable program code is executed by a processing section of the apparatus, the computer readable program code comprising:
code configured to cause an apparatus to activate a beam determination operation, wherein the apparatus enters a mode for receiving one or more beam training sequences from an access point with which the apparatus is associated;
second code configured to cause the apparatus to receive the one or more beam training sequences;
third code configured to cause the apparatus to determine a signal quality metric corresponding to each of the one or more beam training sequences based on an algorithm supported in the apparatus; and
fourth code configured to cause the apparatus to select a beam direction, wherein selecting a beam direction comprises:
transmitting a signaling message, the signaling message including an identifier corresponding to the beam direction that was determined to have the highest signal quality metric; and
receiving an acknowledgement or response message from the direction corresponding to the beam direction identifier;
wherein the apparatus activates the beam determination operation by sending an unscheduled beam training request message over a robust omni-directional signal bearer to the access point, and subsequently receives an unscheduled beam training response from the access point, the unscheduled beam training response comprising at least a beam training schedule and a number of beam training packets to be transmitted per beam training sequence.

20. A computer program product comprising computer readable program code recorded on a non-transitory computer readable storage medium, wherein said computer readable program code is executed by a processing section of the apparatus, the computer readable program code comprising:
code configured to cause an apparatus to activate a beam training support operation, wherein the apparatus is an access point and enters a mode for transmitting one or more beam training sequences;
second code configured to cause the apparatus to select predetermined beam directions towards which the one or more beam training sequences will be transmitted;
third code configured to cause the apparatus to transmit the one or more beam training sequences in the selected beam directions;
fourth code configured to cause the apparatus to receive one or more signaling messages, each message comprising at least a receiving apparatus identifier and a selected beam direction identifier;
fifth code configured to cause the apparatus to transmit a response message or an acknowledgement message corresponding to the one or more received signaling messages; and sixth code configured to cause the apparatus to associate each receiving apparatus identifier with each corresponding selected beam direction identifier for directional communications with a corresponding apparatus associated with the access point;

wherein the beam training support operation is activated in response to receiving an unscheduled beam training request message over a robust omni-directional signal bearer and the access point responds by transmitting an unscheduled beam training response, the unscheduled beam training response comprising at least a beam training schedule and a number of beam training packets to be transmitted per beam training sequence.

* * * * *